United States Patent [19]

Krüger et al.

[11] Patent Number: 5,698,635
[45] Date of Patent: Dec. 16, 1997

[54] PREPARATION AND USE OF REACTIVE AND PROCESSABLE FLUOROPOLYMERS

[75] Inventors: Ralf Krüger; David Harrison, both of Köln; Dieter Wrobel, Leverkusen, all of Germany

[73] Assignee: Bayer Aktiengesellschaft, Leverkusen, Germany

[21] Appl. No.: 554,324

[22] Filed: Nov. 2, 1995

[30] Foreign Application Priority Data

Nov. 10, 1994 [DE] Germany .................. 44 40 201.5

[51] Int. Cl.$^6$ .................. C08F 259/00; C08F 271/02
[52] U.S. Cl. .................. 525/276; 524/544; 524/545; 525/281
[58] Field of Search .................. 525/281, 276; 524/544, 545

[56] References Cited

U.S. PATENT DOCUMENTS

| | | | |
|---|---|---|---|
| 4,983,680 | 1/1991 | Ojakaar | 525/281 |
| 5,214,115 | 5/1993 | Langstein et al. | |
| 5,247,036 | 9/1993 | Kruger et al. | 526/255 |

FOREIGN PATENT DOCUMENTS

| | | |
|---|---|---|
| 150953 | 8/1985 | European Pat. Off. . |
| 437619 | 7/1991 | European Pat. Off. . |
| 489314 | 6/1992 | European Pat. Off. . |
| 507468 | 10/1992 | European Pat. Off. . |
| 514674 | 11/1992 | European Pat. Off. . |
| 2358424 | 2/1978 | France . |
| 1299873 | 7/1969 | Germany . |
| 653936 | 7/1948 | United Kingdom . |

OTHER PUBLICATIONS

Ullmann's Encyclopedia of Industrial Chemistry, vol. A23 Rubber, 3. Synthetic, pp. 265–269.

*Primary Examiner*—Edward J. Smith
*Attorney, Agent, or Firm*—Sprung Kramer Schaefer & Briscoe

[57] ABSTRACT

A reactive and processable fluoropolymer, obtainable by mechanical shearing of a fluoropolymer A) comprising polymerized monomer units of at least one fluorinated, optionally substituted, alkene with 2 to 8 carbon atoms and optionally at least one member selected from the group consisting of a perfluorinated vinyl ether, non-fluorinated olefin and non-fluorinated vinyl ester, and 0.3 to 7% of a compound B) which possesses a double bond (I) capable of adding to polymeric radical fragments and a Π-electron system which is either conjugated with double bond (I) or has readily transferrable hydrogen atoms in the allyl or benzyl position and optionally further double bonds or reactive groups and optionally further auxiliary agents (C).

The fluoropolymer is especially useful in radical addition or nucleophilic or electrophilic substitution or addition, e.g. cross-linking or grafting.

12 Claims, No Drawings

PREPARATION AND USE OF REACTIVE AND PROCESSABLE FLUOROPOLYMERS

Preparation and use of reactive and processable fluoropolymers The present invention relates to reactive and processable fluoropolymers, a process for their preparation, a process for preparing cross-linked, grafted or modified fluoropolymers by using the reactive and processable fluoropolymers and their use.

Fluoropolymers are always used in industrial applications when special properties such as low surface tension or high resistance to heat, chemicals or solvents are required. When used in the fluoroelastomer field, fluorinated rubbers have to be cross-linked after being shaped.

The most common types of cross-linking used for fluorinated rubbers are the bisphenol or bisamino type and peroxidic cross-linking. Peroxidically cross-linked fluorinated rubbers, as compared with amino or phenolically cross-linked fluorinated rubbers, have a higher resistance to acids, bases, steam and the oils which contain aggressive nucleophilic additives used in motor vehicles (Ullmanns Encyclopedia of Industrial Chemistry, 5th ed., 1993, vol. A 23, Chapter 2.6, p. 265–269).

Whereas a copolymer chain consisting of the monomeric building blocks vinylidene fluoride (VDF), hexafluoropropene (HFP) and optionally tetrafluoroethylene (TFF) can be directly attacked by amines or bisphenols in the presence of suitable catalysts, and cross-linking bridges can be created after first eliminating HF at specially exposed HFP-VDF-HFP sequences, cross-linking cannot be initiated by radicals in fluorinated polymer chains due to the high bonding energies.

Cross-linking initiated by radicals (peroxidic) with this type of fluorinated rubber having fluorine contents >60% is only possible if these contain corresponding reactive groups (cure sites). These are mainly bromine and/or iodine substituents which are covalently bonded to the polymer chain. Introduction into the polymer chain is achieved either by copolymerization of bromine-containing monomers, in the simplest case using bromotrifluoroethylene, or by controlling with compounds which contain iodine or iodine and bromine, e.g. 1,2-diiodoethane, 1-bromo-2-iodoethane. During a subsequent cross-linking procedure, the bromine or iodine substituents can be readily abstracted and cross-linking bridges are created at the radical sites thereby produced, by means of a co-curing agent. Although the fluorinated chain remains undamaged in this case, and is thus more stable than a bisphenolically cross-linked fluorinated rubber, volatile toxic decomposition products such as methyl bromide or iodide are produced during curing, which are unacceptable from an occupational safety aspect and also create problems with regard to mold fouling and metal adhesion. On the one hand, additional operations are required in order to introduce these expensive cure sites and, on the other hand, the halogen substituents are eliminated again during curing and are thus not constituents of the cross-linking bridges.

EP 489 314 and EP 514 674 disclose non-cross-linked copolymers made from fluorinated monomers and bi or trifunctional monomers which contain free double bonds and can thus be radically cross-linked. These have the advantage, as compared with iodine/bromine-containing fluorinated rubbers, that they do not release alkyl halides during curing, and cured products with high elongations and strengths are produced. The bi or trifunctional monomer is incorporated into the fluorinated polymer chain in this case by means of copolymerization in aqueous dispersion (emulsion polymerization).

Depending on the chemical nature of the multifunctional cure site monomers, copolymerization with fluorinated monomers presents a few problems. The compounds in question frequently exert a retarding effect on polymerization, e.g. by transferring allyl hydrogen atoms in a chain-stopping procedure when using triallyl isocyanurate as a trifunctional cure site monomer. In addition, secondary reactions may take place at lateral double bonds which are bonded to the polymer (branching or even cross-linking), which lead to the production of unwanted high molecular weights, which has a negative effect on the processing properties. All in all, this route requires polymerization conditions which are difficult to handle.

The object of the present invention is therefore the provision of processable and reactive, i.e. for example, radically cross-linkable, fluoropolymers which have lateral double bonds and which have good processing properties such as flow behavior, such as flow behavior, mold release and without mold fouling, as well as good mechanical and ageing properties in the cross-linked state.

Surprisingly, it has now been found that fluoropolymers according to the invention, which can be prepared by the mechanical shearing of fluoropolymers which contain no reactive groups in the presence of compounds which possess a double bond (I) capable of adding to polymeric radical fragments and II-electron systems which are either conjugated with double bond (I) or possess readily transferrable hydrogen atoms in the allyl or benzyl position and optionally other double bonds or reactive groups, have a very high reactivity, i.e. they can be either cross-linked, grafted or modified by means of further polymer analogous reactions and are also highly processable.

Moreover, the fluoropolymers which contain no reactive groups used for mechanical shearing can be readily prepared because no cure site units have to be introduced and molecular weight regulation can be omitted, which provides advantages with regard to process control and simplifies working up and the treatment of aqueous effluents and vent gases.

Thus, the present invention provides reactive and processable fluoropolymers, obtainable by mechanical shearing of fluoropolymers A), which consist of polymerized monomer units of one or more fluorinated, optionally substituted, alkenes with 2 to 8 carbon atoms and optionally perfluorinated vinyl ethers, non-fluorinated olefins and/or non-fluorinated vinyl esters and 0.3 to 7% of compounds B), which possess a double bond (I) capable of adding to polymeric radical fragments and II-electron systems which are either conjugated with double bond (I) or have readily transferrable hydrogen atoms in the allyl or benzyl position and optionally further double bonds or reactive groups and optionally further auxiliary agents (C).

The fluoropolymers A) which are used in the context of the invention are prepared by radical polymerization of one or more fluorinated monomers, optionally in combination with non-fluorinated monomers, wherein these are preferably fluorinated, optionally substituted, ethylenes which carry hydrogen and/or chorine in addition to fluorine such as, for example, vinylidene fluoride, tetrafluoroethylene and chlorotrifluoroethylene, fluorinated 1-alkenes with 2–8 carbon atoms such as, for example, hexafluoropropene, 3,3,3-trifluoropropene, chloropentafluoropropene, hexafluoroisobutene, perfluorinated vinyl ethers of the formula $CF_2=CF-O-X$ where $X=a\ C_1-C_3$-perfluoroalkyl or $(CF_2CFY-O-)_nR_F$ group, wherein $n=1-4$, $Y=F$ or $CF_3$ and $R_F=a\ C_1-C_3$-perfluoroalkyl group, as well as non-fluorinated, linear or branched, acyclic or cyclic olefins such as, for example, ethylene, propene, isobutene % vinyl esters, for example vinyl acetate. For combinations of fluorinated rubbers, it is important that the polymer contains, in addition to fluorinated ethylenes, sufficient vinyl compounds like fluorinated propenes, ethers etc. distributed uniformly along the whole polymer chain, so that crystallization is effectively suppressed. In general this amounts to >14 mol-%. Fluorinated rubber copolymers which consist of vinylidene fluoride ($CF_2=CH_2$), hexafluoropropene ($CF_2=CF-CF_3$) and optionally tetrafluoroethylene ($CF_2=CF_2$) and/or perfluorinated vinyl ethers such as, for example, perfluoro(methyl-vinyl-ether) are particularly preferred. Fluoropolymers A) are characterized by a type of molecular weight distribution such that the $M_{10}$ value (=average molecular weight of the last 10% of the eluate, i.e. the lowest molecular weight fraction) is >50 kg/mol, when determined by gel permeation chromatography (GPC).

Gel chromatography was performed by the coupled methods of GPC and viscometry on a column combination for $M=10^3-5\times10^7$ g/mol in DMF with the addition of 1 g/l of LiBr at 35° C. and evaluating the results using a BENOIT universal calibration curve.

In one embodiment of the present invention, fluoropolymer A) is a rubber with $M_{10}>50$ kg/mol, particularly preferably with $M_{10}>100$ kg/mol.

Ionic terminal groups on fluoropolymers A) lead to a high yield of reactive groups during mechanical shearing without thereby impairing the free-flowing properties of the resulting reactive and processable fluoropolymers at the processing temperatures which are conventional for molding procedures (>100° C.).

Carboxylate terminal groups which can be introduced, for instance, by the permanganate/oxalate initiator system are preferred.

Compound B) which is used in the context of the invention is a compound which has a double bond (I) capable of adding to a polymeric radical fragment.

This may be any carbon-carbon double bond, optionally substituted in the 1, 1,1 or 1,2 positions, provided its reactivity towards radicals is not impaired by electronic or steric effects. Furthermore, Compounds B) possess II-electron systems which are either conjugated with double bond (I), or have readily transferrable hydrogen atoms in the allyl or benzyl position. II-electron systems are double bonds which are aromatic or olefinic or possess heteroatoms in addition to carbon atoms.

Compounds from the following groups are particularly preferred:

  (1)

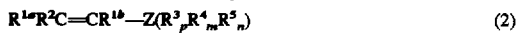  (2)

  (3)

  (4)

which may be present separately or as a mixture, wherein $R^{1a}$ and $R^{1b}$, independently of each other, represent H, F or a $C_1-C_6$-alkyl group, $R^2$ represents H or F;

Z represents an acyclic or cyclic, aliphatic or aromatic, organic or inorganic group, which carries further olefinic double bonds and/or reactive groups represented by each of $R^3$, $R^4$ and $R^5$ such as, for example, pentafluorophenyl, $-CF_2-CN$, $-OH$, acid groups and their derivatives, wherein p, m and n may assume numerical values from 0 to 3 and the sum of p+m+n is a maximum of 3 and $R^3$, $R^4$ and $R^5$ may be identical or different from each other.

Component B) is preferably a diallyl or triallyl or methallyl ester of a polybasic organic or inorganic acid such as, for example, alkenyl cyanurates or isocyanurates such as triallyl cyanurate or isocyanurate or trimethallyl isocyanurate, diallyl phthalate, triallyl phosphate, triallyl citrate, triallyl mellitate, trimethyl-triallyl cyclotrisiloxane and/or diallyl or triallyl or methallyl ethers of dihydric or trihydric alcohols including acetals such as, for example, trimethylolpropane-trimethallyl ether and/or acyclic and cyclic dienes or trienes such as, for example, 1,4- or 1,5-hexadiene or 1,4-pentadiene, myrcene, limonene, norbornadiene, ethylidenenorbornene, dicyclopentadiene and/or compounds which contain strained rings in addition to one or more double bonds such as, for example, α-pinene or norbornene and/or styrene or α-methylstyrene derivatives which are substituted in the phenyl ring such as, for example, p-isopropenylphenyl acetate and pentafluorostyrene.

Those compounds B) which contain several olefinic double bonds and which retain at least one of these after addition to the polymer chain are particularly preferred. In a particularly preferred manner, compound B) is a combination of triallyl isocyanurate or triallyl cyanurate with trimethallyl isocyanurate and/or pinene and/or limonene and/or myrcene and/or ethylidenenorbornene.

The decrease in molecular weight during the shearing of fluoropolymers A) in the presence of compounds B) may optionally be promoted by the addition of compounds C).

In one embodiment of the present invention, therefore, the reactive and processable fluoropolymer also contains, in addition to compounds A) and B), also auxiliary agents C), which are organic compounds containing preferably readily oxidizable hydroxyl and carboxyl groups such as, for example, oxalic acid, succinic acid, malic acid, tartaric acid, citric acid, ascorbic acid, folio acid and glycol, glycerine, classical masticating agents such as, for example, pentachlorothiophenol, its zinc salt or 2,2-dibenzamido-diphenyl disulphide as well as iron, copper, cobalt, nickel or chromium complexes of phthalocyanine or acetylacetonate which act as oxygen transferring agents, iodine or bromine-containing compounds, anti-aging agents or radical inhibitors such as, for example substituted aromatic amines, phenols or quinones, for example benzoquinone, pyrogallol (2,3-dihydroxyphenol), 1,5-di-t-butyl-p-cresol or N-substituted p-phenylenediamines or mixtures thereof.

Preferred auxiliary agents C) are oxalic acid, succinic acid, malic acid, tartaric acid, citric acid, ascorbic acid, folio acid and glycol, glycerine, pentachlorothio-phenol, its zinc salt or 2,2-dibenzamido-diphenyl disulphide and iron, copper, cobalt, nickel or chromium complexes of phthalocyanine or acetylacetonate, benzoquinone, pyrogallol (2,3-dihydroxyphenol), 1-5-di-t-butyl-p-cresol or N-substituted p-phenylenediamines or mixtures thereof.

The reactive and processable fluoropolymers preferably contain 0.1 to 5 parts of auxiliary agents C) per 100 parts of fluoropolymer A).

The reactive and processable fluoropolymers preferably possess, when compared with fluoropolymers A), a weight average molecular weight which has been reduced by at least ⅓.

The present invention also provides a process for preparing reactive and processable fluoropolymers in which fluoropolymers A) are reacted with at least one compound B) and optionally compounds C) under the effect of mechanical shearing.

For the shearing procedure in the process according to the invention, any known mixing unit such as, for example, two roll mixers, internal mixers, Brabender mixers, twin-screw extruders, etc, may be used.

The processing temperature depends on the equipment used and the initial viscosity of the fluoropolymer. It should be as low as possible, but above the glass transition temperature of the corresponding fluoropolymer A).

In the process according to the invention, the processing temperature is preferably above the glass transition temperature of fluoropolymer A) and the time of shearing is $\geq 1$ min.

In the case of fluorinated rubbers, the initial temperature when using a closed unit should not exceed 120° C. and is gradually lowered with increasing degradation, depending on the desired final viscosity. When processing on a two roll mixer with a friction ratio of at least 1.1:1, the bulk temperature of rubbers can be kept below 60° C. The residence time in the shearing region also depends on the type of equipment and may be a few minutes (2–5 min) at a high shear or up to 60 min in the case of a low shear.

The modified fluoropolymers which result from this procedure contain chemically bonded lateral and/or terminal reactive groups, preferably olefinic double bonds, and may have molecular weights which are reduced by ⅓ as compared with those of the initial polymers.

The present invention also provides a process for preparing cross-linked, grafted or modified fluoropolymers in which the reactive and processable fluoropolymers according to the invention are used in radical addition or nucleophilic or electrophilic substitution or addition reactions.

Depending on the chemical nature of the reactive groups introduced, low molecular weight, oligomeric or polymeric compounds which contain appropriate functional groups are required for cross-linking, grafting or modifying. Thus, in the event that the reactive groups introduced are pentafluorophenyl or acid groups or their derivatives, the fluoropolymers according to the invention may be reacted with nucleophilic or bisnucleophilic compounds such as, for example, 2,2-bis-(4-hydroxyphenyl)-propane or hexamethylenediamine. For the preferred case, when the fluoropolymers according to the invention contain lateral or terminal olefinic double bonds, they may be grafted or cross-linked using a radical route, by means of irradiation or radical-forming substances such as organic peroxides, or by special mechanisms such as, for example, Si—H addition. For the special case where the fluoropolymers are rubbers, these may be compounded by known methods with a mixture of components which is conventional for peroxidic curing such as fillers, acid acceptors, co-curing agents and peroxide and then cured afterwards in their intended shape. Curing mixtures according to the invention are characterized by a low degree of stickiness and mold fouling. Homogeneous networks are produced which form the basis for small residual compression set and residual strains.

The present invention also provides use of the reactive and processable fluoropolymers for cross-linking, grafting or other polymer-analogous reactions.

The invention will be further described in the following illustrative examples wherein all parts are by weight unless otherwise expressed.

EXAMPLES

Example 1

21.2 kg of deionized water and 35.2 g of ammonium perfluorooctanoate were initially placed in a 36 l autoclave. 18.3 g of oxalic acid dihydrate and 174.4 g of ammonium oxalate monohydrate were dissolved therein, wherein the pH of the entire aqueous mixture was adjusted to 4.4. Nitrogen was then admitted to the sealed autoclave at a pressure of 10 bar and the pressure was then decreased to atmospheric pressure, this procedure being performed four times. 300 g of vinylidene fluoride and 392 g of hexafluoropropene were added to the autoclave and the reaction mixture was heated to 25° C. with stirring. After reaching this temperature, the pressure inside the autoclave was 9.7 bar. Polymerization was initiated by the continuous addition of 290 ml per hour of an aqueous solution which contained 20 g/l of potassium permanganate. Recognizable from the pressure starting to decrease, polymerization began after 38 min. At this point the rate of supply of potassium permanganate solution was reduced to 145 ml/h. During polymerization, a monomer mixture of 60 wt. % of vinylidene fluoride and 40 wt. % of hexafluoropropene was introduced under pressure so that the pressure inside the autoclave was held constant at 9.4±0.2 bar. Over a reaction time of 190 min, a total of 3.6 kg of vinylidene fluoride and 2.4 kg of hexafluoropropene were pumped in in this way. To terminate polymerization, the permanganate supply was stopped, the unconverted monomer mixture was removed by releasing the pressure and evacuating the reactor and the remaining contents of the autoclave were cooled down. 28.2 kg of a coagulate-free, aqueous dispersion with a solids content of 22.3% were obtained.

To coagulate the product, the latex was poured slowly with stirring into 10 kg of an aqueous precipitation mixture in which 232 g of calcium chloride had been dissolved and which had been acidified to a pH of 2–3 with hydrochloric acid. The product was filtered off, washed with water and then dried for 24 h at 50° C. in a vacuum drying cabinet, wherein 6.2 kg of a rubber-like copolymer were obtained. The following copolymer composition was determined by means of $^{19}F$ NMR analysis: 21.4 mol-% of hexafluoropropene, 78.6 mol-% of vinylidene fluoride.

The copolymer is completely soluble in THF and DMA*C (dimethylacetamide). The Mooney viscosity of the product, $ML_{1+10}$ (100° C.) was 117 units. The molecular weights given in Table 1 were determined by gel permeation chromatography using the coupled methods of GPC and viscometry on a column combination for $M=10^3 \ldots 5 \times 10^7$ g/mol, in DMF and with the addition of 1 g/l of LiBr at 35° C., and evaluation using a BENOIT universal calibration curve.

To prepare a radically cross-linkable and highly processable fluorinated rubber, 150 g of the rubber, prepared as described above, was reacted with 3.5 g of trimethallyl isocyanurate under the effect of shear stress on a standard roll mill (150×350) with a roll nip of 0.15 mm and a friction of 1:1.33. Immediately after addition of the trimethallyl isocyanurate, the formation of a smooth-milled sheet was observed. The reaction was terminated after a shearing time of 2 min. The resulting trimethallyl isocyanurate-containing copolymer was also analyzed by gel chromatography. The results are given in Table 1.

To prepare a curable mixture, 100 parts by wt. of the rubber modified in the way described above was compounded on a two-roll mixer with 30 parts by wt. of carbon black, 3 parts by wt. of calcium hydroxide, 2 parts by wt. of Perkalink® 301/50 (triallyl isocyanurate, 50% strength in an inactive filler) and 3 parts by wt. of Luperco® 130XL (2,5-dimethyl-2,5-bis-(tert-butyl)-hex-3-yne; 45% strength in an inactive filler) to give a curable mixture.

The flow behavior before curing and the increase in density of cross-linking of this mixture was investigated by means of torsional shear modulus measurements using a Monsanto rheometer model MDR 2000 E at 170° C. by using the change in torque s' (~storage modulus) or s" (~loss modulus). In order to investigate the mechanical properties of the cured product, the said curable mixture was compression cured at 170° C. and 200 bar in a mold (1×10×10 mm) for 30 min and then post-cured in a circulating air oven (1 h at 160° C., 1 h at 170° C., 2 h at 180° C. and 20 h at 200° C.). The MDR results (s'$_{min}$ or s'$_{max}$=torque at the minimum, before curing, and at the maximum after 30 min, respectively, and the corresponding loss factors tanδ=s'/s") and mechanical properties are set forth in Table 1.

Example 2

A compact milled sheet was first prepared from 1943 g of the vinylidene fluoride/hexafluoropropene copolymer prepared in accordance with Example 1 and 38.9 g of trimethallyl isocyanurate and this was then sheared for 10 min. in a 1500 ml GK1.5E-3 Brabender internal mixer. The internal temperature then increased to 94° C. Subsequent compounding and curing were performed in the same away as in Example 1 and the results are also given in Table 1.

Example 3

130 kg of deionized water and 1.3 kg of a 31% strength solution of lithium perfluorooctyl sulphonate were initially introduced into a 195 l autoclave. 200 g of oxalic acid dihydrate were dissolved therein and the whole solution was adjusted to a pH of 3 using lithium hydroxide. Nitrogen was admitted to the sealed autoclave and the pressure then reduced to atmospheric pressure, this procedure being repeated several times. 1.7 kg of vinylidene fluoride, 2.05 kg of hexafluoropropene and 0.38 kg of tetrafluoroethylene were then added to the autoclave and the reaction mixture was heated to 25° C. with stirring. After reaching this temperature, the pressure inside the autoclave was 13.3 bar. Polymerization was initiated by the continuous addition of an aqueous solution which contained 10 g/l of potassium permanganate. During polymerization, a monomer mixture of 54.25 wt. % of vinylidene fluoride, 36.25 wt. % of hexafluoropropene and 9.5 wt. % of tetrafluoroethylene was added under pressure so that the pressure inside the autoclave remained constant at 13.3 bar. Over a total reaction time of 2.1 hours, a total of 21.7 kg of vinylidene fluoride, 14.5 kg of hexafluoropropene, 3.8 kg of tetrafluoroethylene and 2.1 kg of potassium permanganate solution were pumped in. Polymerization was terminated in the same way as described in Example 1. 176.3 kg of a coagulate-free aqueous dispersion with a solids content of 24% were obtained and precipitated in the same way as in Example 1.

Copolymer composition: 17.6 mol-% of hexafluoropropene, 75.5 mol-% of vinylidene fluoride, 6.9 mol-% of tetrafluoroethylene.

The rubber was reacted with trimethallyl isocyanurate under the effects of a shearing force in the same way as described in Example 1. Further, copolymers modified with trimethallyl isocyanurate, of the same overall composition, were prepared, the shearing time on the rolls being increased to 4, 6 and 8 min. Subsequent compounding and curing were performed in the same way as in Example 1, the results also being given in Table 1.

The results given in Table 1 show that uncured rubbers which have different molecular weights are degraded to about the same extent under the effects of a shearing force in the presence of trimethallyl isocyanurate and gain the ability to build up the network. Longer shearing times under the conditions selected do not lead to further degradation or to a further increase in cross-linking density.

TABLE 1

| | Example | | | | | |
|---|---|---|---|---|---|---|
| | 1 | 2 | 3 | | | |
| $M_{10}$ | 380 | n.b. | 2970 | | | |
| $M_n$ | 890 | n.b. | 6750 | | | |
| $M_w$[kg/mol] (uncured polymer) | 4080 | n.b. | 25650 | | | |
| Shearing equipment | two roll mill | int. mixer | two roll mill | two roll mill | two roll mill | two roll mill |
| Shearing time [min] | 2 | 10 | 2 | 4 | 6 | 8 |
| $M_{10}$ | 250 | n.b. | 300 | n.b. | n.b. | n.b. |
| $M_n$ | 540 | n.b. | 730 | | | |
| $M_w$[kg/mol] (with TMAiC[1]) | 2320 | n.b. | 3240 | | | |
| MDR/170° C. | | | | | | |
| s'$_{min}$[dNm] | 4.2 | 4.6 | 3.45 | 3.53 | 3.45 | 3.43 |
| tanδ$_{min}$ | 0.82 | 0.67 | 0.90 | 0.89 | 0.89 | 0.89 |
| $t_s^2$[min] | 1.16 | 1.8 | 1.38 | 1.35 | 1.38 | 1.34 |
| s'$_{max}$[dNm] | 22.0 | 20.2 | 20.8 | 20.54 | 20.31 | 19.8 |
| tanδ$_{max}$ | 0.087 | 0.11 | 0.096 | 0.10 | 0.10 | 0.10 |
| $M_{50}$ | 1.57 | 1.90 | 1.51 | 1.54 | 1.43 | 1.54 |
| $M_{100}$ | 2.48 | 2.86 | 2.38 | 2.40 | 2.34 | 2.57 |
| Tensile strength [N/mm²] | 23.8 | 21.5 | 24.0 | 22.7 | 23.8 | 23.9 |
| Elongation at break [%] | 261 | 271 | 322 | 302 | 296 | 313 |

[1]after modifying with trimethallyl isocyanurate
[2]scorch time
n.b. = not determined

Comparison Examples 4–5

The uncured polymers prepared in accordance with Examples 1 and 2 were modified in the same way using triallyl isocyanurate instead of trimethallyl isocyanurate. The results of the MDR measurements show that the compounds already possess a large elastic fraction before being cured (s'$_{min}$ high, tanδ$_{min}$ low), thus that no degradation had occurred, and that they cured very rapidly ($t_s$ low). This type of compound is very difficult to process to produce molded items.

TABLE 2

Results of MDR measurements at 170° C.

| | Comparison example | |
|---|---|---|
| | 4 | 5 |
| s'$_{min}$[dNm] | 10.36 | 11.0 |
| tanδ$_{min}$ | 0.387 | 0.325 |
| $t_s$[min] | 0.6 | 0.5 |
| s'$_{max}$[dNm] | 22.6 | 19.9 |
| tanδ$_{max}$ | 0.076 | 0.1 |

Examples 6–9, Comparison Example 10

In a similar way to that described in Example 1, vinylidene fluoride/hexafluoro-propene copolymers of the same composition with approximately 78 mol-% of vinylidene fluoride units in the copolymer were prepared, these having low or molecular weights as compared to those resulting in accordance with Examples 1–3 even before modification according to the invention. The results of modification and curing in the same way as in Example 1 are given in Table 3.

results of the torque measurements (s) on the compounds after 5, 10 and 20 min shearing time are given in Table 4.

TABLE 3

| | Example | | | Comp. Example | |
|---|---|---|---|---|---|
| | 6 | 7 | 8 | 9 | 10 |
| $M_{10}$ | 230 | 210 | 150 | 60 | 45 |
| $M_n$ | 600 | 550 | 390 | 130 | 100 |
| $M_w$[kg/mol] (uncured polymer) | 2220 | 1730 | 1160 | 340 | 780 |
| MDR/170° C. | | | | | |
| $s'_{min}$[dNm] | 3.6 | 3.1 | 2.67 | 2.42 | 1.58 |
| $tan\delta_{min}$ | 0.76 | 0.84 | 0.94 | 0.96 | 1.24 |
| $t_s$[min] | 2.2 | 2.3 | 2.3 | 2.9 | 3.6 |
| $s'_{max}$[dNm] | 16.3 | 15.1 | 13.8 | 12.3 | 10.0 |
| $tan\delta_{max}$ | 0.14 | 0.17 | 0.19 | 0.2 | 0.254 |
| $M_{50}$ | 1.8 | 1.9 | 1.7 | 1.8 | 1.7 |
| $M_{100}$ | 2.6 | 2.9 | 2.4 | 2.5 | 2.1 |
| Tensile strength [N/mm$^2$] | 20.7 | 19.2 | 19.9 | 19.2 | 18.0 |
| Elongation at break [%] | 368 | 353 | 407 | 403 | 464 |

TABLE 4

| | Example | |
|---|---|---|
| | 12 | 15 |
| Additive [g] | limonene 4 | ascorbic acid 2 |
| shearing time [min] | s'(MDR/170° C.) | [dNm] |
| 0 | 16.8 | 16.8 |
| 5 | 8.4 | 9.7 |
| 10 | 4.1 | 6.1 |
| 20 | 1.4 | 2.5 |

Curable mixtures were prepared from 150 g of each of the compounds prepared in the way described above by further incorporation of 45 g of carbon black, 4.5 g of calcium hydroxide and 4.5 g of Luperco® 130 XL (2,5-dimethyl-2,5-bis-(tertiary butyl)-hex-3-yne; 45% strength in an inactive filler) and these were cured and tested in the same way as described above, see Table 5.

TABLE 5

| | Example | | | | | | |
|---|---|---|---|---|---|---|---|
| | 11 | 12 | 13 | 14 | 15 | 16 | 17 |
| Additive/[g] | TMAiC/4 | limonene/4 | α-Pinene/4 | 1,2-diiod-ethane/2 | ascorbic acid/2 | Renacit 7[1]/2 | KA 9156[2]/2 |
| MDR/170° C. | | | | | | | |
| $s'_{min}$[dNm] | 3.9 | 3.7 | 4.4 | 3.8 | 4.9 | 4.49 | 4.13 |
| $tan\delta_{min}$ | 0.87 | 0.91 | 0.80 | 0.92 | 0.70 | 0.766 | 0.81 |
| $t_s$[min] | 1.1 | 1.1 | 1.0 | 0.7 | 0.6 | 1.26 | 1.36 |
| $s'_{max}$[dNm] | 21.7 | 16.8 | 16.9 | 20.1 | 18.7 | 21.02 | 20.1 |
| $tan\delta_{max}$ | 0.10 | 0.15 | 0.14 | 0.10 | 0.12 | 0.085 | 0.09 |
| $M_{50}$ | 1.85 | 1.62 | 1.60 | 1.65 | 1.97 | 1.68 | 1.66 |
| $M_{100}$ | 2.94 | 2.35 | 2.35 | 2.44 | 3.22 | 2.41 | 2.41 |
| Tensile strength [N/mm$^2$] | 21.0 | 25.3 | 23.5 | 23.2 | 23.7 | 20.7 | 21.1 |
| Elongation at break [%] | 218 | 352 | 312 | 311 | 336 | 406 | 432 |

[1]Renacit 7 = pentachlorothiophenol, 45% in quarz-containing kaolin and approximately 5% paraffin oil
[2]KA 9156 = 2,2'-dibenzamido-diphenyl disulphide, 40% ig in quartz containing kaolin + paraffin oil, wax Comparison of examples 6–9 with comparison Example 10 shows that uncured rubbers with $M_{10}$ values which are less than 50 kg/mol are no longer adequately cross-linkable. Moreover, the cured product in comparison Example 10 sticks when removed from the hot mold.

Examples 11–17

200 g of the uncured rubbers prepared in accordance with Example 3 were initially sheared on their own for 2 minutes to give a milled sheet, on a standard roller (150×350) using a roll nip of 0.15 mm and a friction ratio of 1:1.33, and then, immediately after each other, 6 g of Percalink® (=3 g of TAiC) and the amounts given in Table 4 of further compounds of the type B) and optionally C) were added and the mixture was sheared for 20 min. After 5 and 10 min shearing time respectively, samples for torsional shear cure-meter measurements were withdrawn in Examples 12 and 15. The

We claim:

1. A reactive and processable fluoropolymer obtainable by mechanical shearing of a fluoropolymer A) which contains no bromine or iodine substituents which are covalently bonded, and no free double bonds and comprises polymerized monomer units of at least one fluorinated, optionally substituted, alkene with 2 to 8 carbon atoms characterized by a $M_{10}$-value>50 kg/Mol and optionally at least one member of the group consisting of a perfluorinated vinyl ether, a non-fluorinated olefin and a non-fluorinated vinyl ester, and 0.3 to 7% of a compound B) which contains a double bond (I) capable of adding to polymeric radical fragments and a II-electron system which is either conjugated with double bonds (I) or has readily transferable hydrogen atoms in the allyl or benzyl position and optionally further double bonds and optionally further auxiliary agents (c), with the provisio that if B) is triallyl isocyanurate or triallyl cyanurate it must be combined with at least one member of the group consisting of trimethallyl isocyanurate, α-pinene, limonone, myrcene and ethylidene-norbornene or at least one auxiliary agent (c).

2. A reactive and processable fluoropolymer according to claim 1, wherein B) comprises at least one compound selected from the group consisting of

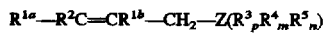 (1)

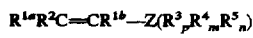 (2)

 (3)

and

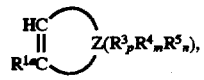 (4)

wherein $R^{1a}$ and $R^{1b}$ each independently is H, F or a $C_1$–$C_6$-alkyl group, $R^2$ is H or F;

Z is a group which carries further olefinic double bonds or radicals of the formulas $R^3$, $R^4$ and $R^5$, p, m and n are from 0 to 3, and the sum of p+m+n is from 0 to 3, and $R^3$, $R^4$, $R^5$ each independently is selected from the group consisting of further olefinic groups or pentafluorophenyl, $CF_2CN$, —OH, an acid group, or a derivative thereof.

3. A reactive and processable fluoropolymer according to claim 2, wherein $R^3$, $R^4$ and $R^5$ each independently is selected from the groupo consisting of pentafluorophenyl, $CF_2CN$, —OH, an acid group, or a derivative thereof.

4. A reactive and processable fluoropolymer according to claim 1, wherein compound B) comprises at least one member selected from the group consisting of a diallyl or triallyl or methallyl ester of a polybasic organic or inorganic acid, a diallyl or triallyl or methallyl ether of diols or triols or acetals, dienes or trienes, a compound which contains a strained ring as well as at least one double bond and a styrene or α-methylstyrene substituted in the phenyl ring.

5. A reactive and processable fluoropolymer according to claim 1, including an auxiliary substance C) selected from the group consisting of at least one readily oxidizable hydroxyl or carboxyl-containing organic compound, mastication agent, iron, copper, cobalt, nickel or chromium complex of phthalocyanine or acetylacetonate which acts as an oxygen transferring agent, iodine-bromine, iodine or bromine containing compound, anti-aging additive or a radical inhibitor.

6. A reactive processable fluoropolymer according to claim 1, containing at least one auxiliary substance C) selected from the group consisting of oxalic acid, succinic acid, malic acid, tartaric acid, citric acid, ascorbic acid, folic acid, glycol, glycerine, pentachlorothiophenol, its zinc salt, 2'-dibenzamido-diphenyl disulphide, and iron, copper, cobalt, nickel or chromium complexes of phthalocyanine or acetylacetonate, benzoquinone, pyrogallol (2,3-dihydroxyphenol), 1,5-di-t-butyl-p-cresol or N-substituted p-phenylenediamines.

7. A reactive processable fluoropolymer according to claim 1, containing 0.1 to 5 parts of auxiliary agent C) per 100 parts of fluoropolymer A).

8. A reactive processable fluoropolymer according to claim 1, having a molecular weight which is reduced by at least ⅓ when compared with fluoropolymer A) alone.

9. A process for preparing a reactive and processable fluoropolymer according to claim 1, which comprises reacting a fluoropolymer A) with a compound B) and optionally an auxiliary substance C) with mechanical shearing.

10. A process according to claim 9, wherein the reaction temperature is above the glass transition temperature of fluoropolymer A) and the shearing time is >1 min.

11. In a cross-linking or grafting reaction wherein a polymer or monomer is reacted with a fluoropolymer, the improvement which comprises employing as said fluoropolymer a reactive processable fluoropolymer according to claim 1.

12. A process for preparing a cross-linked fluoropolymer which comprises cross-linking the reactive and processable fluoropolymer of claim 1 by free radical addition, nucleophilic addition, electrophilic addition, nucleophilic substitution or electrophilic substitution.

* * * * *

UNITED STATES PATENT AND TRADEMARK OFFICE
CERTIFICATE OF CORRECTION

PATENT NO. : 5,698,635
DATED : December 16, 1997
INVENTOR(S) : Kruger, et al.

It is certified that error appears in the above-identified patent and that said Letters Patent is hereby corrected as shown below:

Col. 11, line 6    Delete " limonone " and substitute -- limonene --

Signed and Sealed this

Twenty-fifth Day of May, 1999

Attest:

Q. TODD DICKINSON

*Attesting Officer*     *Acting Commissioner of Patents and Trademarks*